(12) United States Patent
Boutron et al.

(10) Patent No.: US 12,479,504 B2
(45) Date of Patent: Nov. 25, 2025

(54) VEHICLE STEERING CONTROL DEVICE

(71) Applicant: Nissan Motor Co., Ltd., Yokohama (JP)

(72) Inventors: Olivier Boutron, Aubevoye (FR); Didier Martinez, Saint Etienne Sous Bailleul (FR)

(73) Assignee: Nissan Motor Co., Ltd., Yokohama (JP)

( * ) Notice: Subject to any disclaimer, the term of this patent is extended or adjusted under 35 U.S.C. 154(b) by 580 days.

(21) Appl. No.: 18/054,665

(22) Filed: Nov. 11, 2022

(65) Prior Publication Data

US 2023/0082309 A1    Mar. 16, 2023

Related U.S. Application Data

(63) Continuation of application No. PCT/EP2021/064546, filed on May 31, 2021.

(30) Foreign Application Priority Data

Jun. 19, 2020   (FR) ..................................... 2006428

(51) Int. Cl.
    *B62D 7/15*       (2006.01)
    *B60T 8/1755*    (2006.01)
    *B62D 6/00*       (2006.01)

(52) U.S. Cl.
    CPC ............ *B62D 7/159* (2013.01); *B60T 8/1755* (2013.01); *B62D 6/003* (2013.01); *B60T 2260/024* (2013.01)

(58) Field of Classification Search
    CPC ...... B62D 7/159; B62D 6/003; B62D 15/025; B60T 8/1755; B60T 2260/024;

(Continued)

(56) References Cited

U.S. PATENT DOCUMENTS

| | | | | |
|---|---|---|---|---|
| 4,998,593 A | * | 3/1991 | Karnopp | ................ B62D 7/159 701/72 |
| 5,341,297 A | * | 8/1994 | Zomotor | ............... B60T 8/4275 701/72 |
| 2007/0185638 A1 | * | 8/2007 | Odenthal | ............... B60W 40/11 701/70 |

FOREIGN PATENT DOCUMENTS

| | | |
|---|---|---|
| DE | 4010332 A1 | 10/1990 |
| JP | 2002-302059 A | 10/2002 |
| JP | 2003-191774 A | 7/2003 |

OTHER PUBLICATIONS

Office Action of Jan. 7, 2025 of corresponding Japanese Patent Application No. 2022-576451.

* cited by examiner

*Primary Examiner* — Sizo B Vilakazi
(74) *Attorney, Agent, or Firm* — GLOBAL IP COUNSELORS, LLP

(57) ABSTRACT

A steering control device is configured to control a steering of a vehicle having at least one piloted actuator associated with a system for steering a wheel of the vehicle and a piloted actuator associated with a decoupled braking system at a wheel of the vehicle. The steering control device includes at least one control unit. The control unit is configured to recover at least one value characteristic of the travel of the vehicle and to issue a control instruction to the at least one piloted actuator according to the recovered value(s). The control unit includes a calculation module in which a model of a lateral dynamic behavior of the vehicle frame is implemented. At least one specific physical quantity of the lateral dynamic behavior is expressed according to the specific drifts of each set of front wheels and rear wheels of the vehicle.

18 Claims, 2 Drawing Sheets

(58) Field of Classification Search
CPC ............... B60T 2260/022; B60T 8/172; B60T 2260/02; B60Y 2400/81; B60Y 2400/84
See application file for complete search history.

VEHICLE STEERING CONTROL DEVICE

CROSS-REFERENCE TO RELATED APPLICATIONS

This application is a continuation application of International Application No. PCT/EP2021/064546, filed on May 31, 2021. This application claims priority to French Application No. 2006428, filed on Jun. 19, 2020. The entire disclosures of the International Application No. PCT/EP2021/064546 and the French Application No. 2006428 are hereby incorporated herein by reference.

BACKGROUND

Technical Field

The invention relates to the steering control devices of a motor vehicle, and more particularly to control devices on which a dynamic behavior model is implemented in order to allow the adjustment of the running gear of a vehicle before it has been put on the road and on the other hand the steering control during driving.

The vast majority of vehicles are now equipped with controlled chassis, i.e. a chassis with at least one control actuator. By way of non-limiting example, the vehicles can be equipped with power steering, configured to adapt the steering angle of the wheels to the driving conditions of the vehicle, or else of decoupled braking system, in which each wheel is associated with an independently controlled brake system so as to be able to generate a braking force specific to each wheel.

The control of these control actuators is generally performed by a vehicle control unit using a vehicle model representing a target behavior that is to be followed by the actual vehicle. During vehicle development tests, the vehicle model is adjusted by trial and error testing until the vehicle model represents a desired behavior by the person in charge of the development of the chassis. And during driving, the control unit refers to this vehicle model adjusted by the trial and error testing to control the operation of the control actuators.

The lateral dynamics model used conventionally to model the behavior of the chassis of vehicles is constructed around a so called dynamics bicycle model that is well known to development engineers and that is based on an equation of the yaw dynamics and an equation of the drift dynamics of the chassis.

In this dynamics bicycle model, the behavior is adjusted via parameters of the modeled vehicle that are the front mass, the rear mass, the equivalent drift rigidities of the running gear or the yaw inertia.

As can be seen, the parameters considered in this model are static parameters that are not directly related to the dynamic behavior of the vehicle whose trajectory is to be control.

In this context, the invention proposes an alternative to the existing control devices. In particular by considering other parameters than those conventionally used and by using, for example, a different model than the single bicycle model previously mentioned. The invention thus proposes a device for controlling the steering of a motor vehicle comprising at least one control actuator associated with a steering system of a wheel of the vehicle, and/or a control actuator associated with a braking system decoupled at a wheel of the vehicle. The control device comprises at least one control unit configured to retrieve at least one characteristic value of the driving of the vehicle and to transmit a control command to the at least one control actuator as a function of this or these retrieved values. According to the invention, the control unit comprises a calculation module on which is implemented a model of lateral dynamic behavior of the chassis of the vehicle in which at least one specific physical quantity of the lateral dynamic behavior is expressed as a function of the specific drifts of each set of front and rear wheels of the vehicle.

The decoupled braking system provided to the vehicle that is equipped with the steering control device according to the invention allows differentiated braking of each wheel of the vehicle via a specific steering control of the control actuators on a wheel per wheel basis as necessary.

The behavior model of the chassis is particular in this case in that it takes into account specific drifts of each set of wheels of the vehicle, in order to take into account, unlike what has been previously possible, the lateral dynamic behavior of the motor vehicle and of its chassis. Therefore, the behavior model is expressed in a much more efficient form in terms of the development of the chassis by bring out the notion of specific drift.

Indeed, the specific drift of the running gear, unlike the purely kinematic drift, takes into account the parameters at the origin of the drift angle, namely, the drift stiffness of the tires, the steering of the running gear (inward or outward) induced by the roll and the steering of the running gear (inward or outward) induced by the transverse forces. It also takes into account the vertical load since it is determined as a function of the latter. This makes it possible to globalize the equivalent drift stiffness under a given vertical load.

It has been found that this lateral dynamic behavior is mainly induced by several physical quantities among which the wheelbase of the vehicle, the mass distribution of the vehicle, that is to say the ratio between the mass at the level of the front axle and the total mass, the inertia distribution, that is to say the ratio between the equivalent inertia of the point masses seen in the trains and the yaw inertia, and the specific drifts of the running gear, that is to say the drift angle taps of the running gears under transverse acceleration.

In particular, the inventors have identified the fundamental role played by the specific drifts of the running gears in the lateral dynamic behavior of the vehicle, as they characterize the guiding performance of the running gear which directly influence the liveness of the response and the lateral stability of the vehicle. The evolution of these specific drifts is in particular measured by an evaluation of a understeer gradient of the vehicle, which makes account of the excess steering wheel angle to be added so that the vehicle follows a trajectory at a given speed. Each specific drift takes into account implicitly the mass of the train and therefore the distribution of the load between the front and rear of the vehicle.

No specific drift expression is explained with the bicycle model conventionally used, in particular because the specific drift of the running gear is a notion specific to the development of the chassis rather than that of the physical and scientific modelling. In this direction, the inventors estimate that the notion of specific drift is fundamental for the setting of the dynamic response of the chassis and propose the parameterization of a control unit, in a steering control device of a vehicle, with a modelling taking into account this specific drift. The specific drifts make it possible to construct a model by simply measuring the transverse acceleration and the vertical loads on each of the running gears, contrary to the notion of drift angle, or it is necessary to measure the tires, the waste and the elastokinematic characteristics (bushings).

More particularly, the modelling implemented makes it possible to link systems variables, such as for example response time, bandwidth or static-dynamic behavior, to specific drifts which further represent the transverse guidance quality of a running train, and the quality of response of the lateral dynamics of a chassis.

According to an optional feature of the invention, it is possible to provide that the lateral dynamic behavior model of the chassis implemented in the calculation module to be configured such that at least the yaw rate is expressed as a function of the specific drifts of each of the front and rear wheel axles of the vehicle.

If necessary, the drift at the center of gravity of the vehicle and the lateral acceleration of the vehicle are also expressed as a function of the specific drifts of each of the front and rear wheel axles of the vehicle.

In this way, each of the specific physical quantities of the lateral dynamic behavior can be expressed as a function of the specific drifts of each running gear, the yaw rate being more specifically modelled in order to subsequently allow the calculation of a reference yaw moment and an effective yaw moment.

According to an optional feature of the invention, the lateral dynamic behavior model of the chassis is configured to express a transfer function between the yaw rate and the steering system of the front wheel set, or the steering of the rear wheel set, or a yaw moment exerted by the actuator (s) associated with the decoupled braking system, as a function of a static-dynamic gain defined as a function of the specific drifts of the front and rear wheel axles of the vehicle.

In this context, the control unit may in particular be configured to issue a priority control command directed to the one or more control actuators associated with the steering system, before transmitting, as appropriate, a control command directed to the one or more control actuators associated with the decoupled braking system.

The expression of the transfer functions as a function of the specific drifts, such as allowing the lateral dynamic behavior model that is presented, makes it possible in particular to show that the longitudinal deceleration to be exerted on the wheels of the vehicle is too large to obtain a gain equivalent to that obtained by the maximum steering permitted by the mechanical structure of the wheel sets.

According to an optional feature of the invention, the static-dynamic gain relating to each of the steering systems of the front and rear wheel axles can be a function of a understeer gradient, that is to say a difference between the specific drift of the front wheel axles and the specific drift of the rear wheel axles.

In particular, it is the deviation between the front and rear specific drifts that determines the lateral liveness of the vehicle. This deviation is referred to as an understeer gradient and reflects, as mentioned above, the excess steering wheel angle to be added so that the vehicle follows a trajectory at a given speed.

In this context, the control unit is configured to issue a priority control command directed to the one or more control actuators associated with the steering system of the rear wheel set, before transmitting if necessary a control command directed to the one or more control actuators associated with the steering system of the front wheel axle.

The expression of the transfer functions as a function of the specific drifts, such as allowing the lateral dynamic behavior model that is presented, makes it possible in particular to show that, from a dynamic point of view, the speed of response is inconsistent with the advantage of a steering input of the wheels of the rear axle, that is to say to the advantage of steering control by first acting on the steering of the rear wheel axle and then the steering of the front wheel axle.

In other words, if a vehicle is equipped with at least one control actuator configured to perform decoupled braking of a wheel of the vehicle, a control actuator configured to perform a steering of a rear wheel of the vehicle and a control actuator configured to perform a steering of a front wheel of the vehicle, a control command, for example for a corrective action generated by the control unit consists of a first time in a control command intended for the actuator of the steering angle of a rear wheel of the vehicle.

According to an optional feature of the invention, it is possible to provide that the control unit is configured to receive input parameters and dynamic driving parameters and that the control unit is configured to first compare a reference datum, calculated by applying the lateral dynamic behavior model of the chassis from values of the input parameters and of reference values of the dynamic driving parameters, at an effective datum, calculated by applying the model of lateral dynamic behavior of the chassis from values of the same input parameters and of actual values of the dynamic driving parameters, and for in a second time generating corrective action instructions in the event of a significant deviation between the reference datum and the actual datum.

The actual values of the dynamic driving parameters may result from measurements carried out in real time when the vehicle is running, via suitable sensors, or may result from test data implemented by an operator during the development of the chassis.

According to an optional feature of the invention, it is possible to provide that the reference datum is a reference yaw moment and the actual datum is an effective yaw moment, the control unit being configured to calculate, on the one hand, the reference yaw moment using the lateral dynamic behavior model of the chassis with the reference values and to calculate, on the other hand, the effective yaw moment using the dynamic behavior model of the chassis with the effective values.

Again, the speed of the vehicle can be recovered by the control unit from a speed sensor onboard the vehicle or following a test datum implemented by an operator.

According to an optional feature of the invention, it is possible to provide that the control unit is configured to calculate simultaneously the reference yaw moment and the effective yaw moment.

The rear specific drift also determines the reaction time constant between the front wheel axle and the rear wheel axle when the vehicle is inscribed in turn. More it is important and the greater the response time between the forces of the rear wheel axle and those of the front wheel axle will be important. A well-keyed vehicle is a vehicle whose rear wheel set response is fast with respect to the front wheel axle. This wedging must make it possible to have a transient that is not perceptible by the driver, in particular during a bearing change. The implementation of the device according to the invention, with the model of behavior of the chassis taking into account specific drifts makes it possible to optimize this performance. In this frame, the device can make it possible to control the yaw moment, which can be generated by one of the driven systems that are the four-wheel steering system, with control actuators making it possible to separately manage the steering of each wheel, and the decoupled braking system, with control actuators making it possible to distinctly manage the braking actions on each of the wheels.

According to an optional feature of the invention, it is possible to provide that the at least one control actuator is an actuator of the steering angle of a rear wheel of the vehicle, the steering angle of this rear wheel being determined for a front wheel angle of the determined chassis and for an equality of the calculated reference yaw moment with the calculated effective yaw moment.

According to an optional feature of the invention, it is possible to provide that the at least one control actuator is a braking actuator decoupled from a wheel of the vehicle, a yaw moment generated by the braking of this wheel being determined for a front wheel angle of the determined chassis and for an equality of the calculated reference yaw moment with the calculated effective yaw moment.

According to an optional feature of the invention, it is possible to provide that the input parameters consist at least in the specific drift of the front wheel axle and the specific drift of the rear wheel axle.

According to an optional feature of the invention, it is possible to provide that the specific drift of the front wheel axle has a reference value of between 0.3 and 1 deg/(m/s2).

According to an optional feature of the invention, it is possible to provide that the specific drift of the rear wheel set has a reference value of between 0.1 and 0.6 deg/(m/s2).

It should be noted that the specific drifts implicitly take into account the phenomena of waste and elastokinematic of the running gear. Therefore, it is unnecessary to estimate the drift stiffnesses of the trains, and consider the specific drifts in the form of a range of values makes it possible to encompass the uncertainties, and for example the variations in the vertical load of the tire induced by the variations in longitudinal and lateral accelerations.

According to an optional feature of the invention, it is possible to provide that the specific drift of the rear wheel axle is fixed and determined according to a type of driving identified by the control unit.

Depending on the speed of the vehicle and the type of desired driving behavior, for example a sports behavior or an economic behavior, the invention makes it possible to modify the reference value of the specific drift of the rear wheel axle. In this context, the control unit may comprise a data table in which a specific drift value is associated with a speed value. The calculation of the reference datum, for example the reference yaw moment, is modified and the control command, for example the steering angle of the rear wheels, which is a function of the comparison of this reference datum with the corresponding actual datum is modified.

According to an optional feature of the invention, it is possible to provide that the input parameters comprise at least the mass distribution and the inertia distribution of the vehicle.

It is thus notable that the lateral dynamic behavior model according to the invention first considers the dynamic parameters of the vehicle such as these distributions, the static parameters which are the mass and the inertia of the vehicle are not considered as a reference parameter but, if necessary, through calculations of gains taken into account during the dynamic parameterization of the vehicle.

According to an optional feature of the invention, it is possible to provide that the input parameters also consist of the mass of the vehicle as well as the wheelbase of the vehicle, and a steering gear ratio.

According to an optional feature of the invention, it is possible to provide that the lateral dynamic behavior model of the chassis is written around a modal decomposition of the relationship between yaw and drift of the vehicle, at least one decomposition being associated with a steering angle actuator of the front wheel axle and at least one other decomposition being associated with a steering angle actuator of the rear wheel set or to a control actuator of a decoupled braking system.

According to an optional feature of the invention, it is possible to provide that the lateral dynamic behavior model of the chassis is configured to express the yaw rate as a function of each of the decompositions.

According to an optional feature of the invention, it is possible to provide that the values retrieved by the control unit consist of the speed of the vehicle, the steering angle of the front wheels and the steering angle of the rear wheels.

According to an optional feature of the invention, it is possible to provide that the control unit is configured to communicate with a plurality of sensors capable of measuring during the driving of the vehicle the values retrieved subsequently by the control unit.

The invention also relates to a method for controlling the direction of a vehicle equipped with a control device according to one of the preceding claims, in which a calculation step is carried out in a first time, in which the module calculates, on the one hand, an effective yaw moment and a reference yaw moment, then a comparison step in which the calculation module equalizes the two calculated yaw moments in order to subsequently deduce therefrom, in a deduction step, at least one value that must comply with the rear angle and/or the braking yaw moment as a function of the steering angle of the front wheels.

The invention will be better understood on reading the following description and to the examination of the figures which accompany it. These figures are given only by way of nonlimiting example of the invention:

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the vehicle field from this disclosure that the following descriptions of the embodiments are provided for illustration only and not for the purpose of limiting the invention as defined by the appended claims and their equivalents.

Basically, the invention is directed to a device for controlling a direction of a motor vehicle capable of generating control commands to actuators controlled by means of a calculation module in which a model of lateral dynamic behavior of the chassis of the vehicle is implemented, in particular taking into account specific drifts of each front and rear wheel axles of the vehicle.

Figure 1:
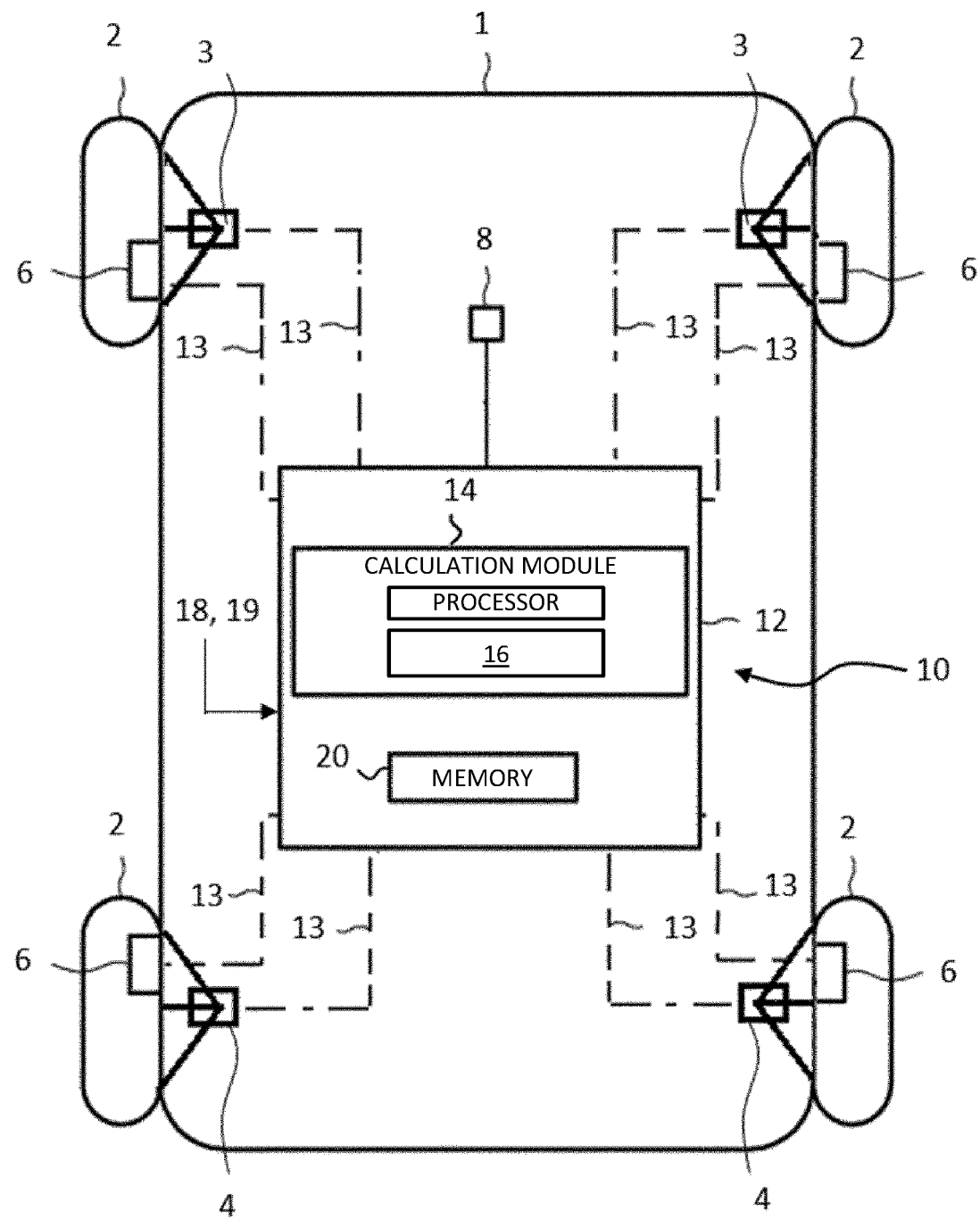
FIG. 1 is a schematic representation of a vehicle and a steering control device according to the invention capable of equipping such a vehicle, in which has been notably illustrated schematically, on a scale making its components visible, a control unit forming part of the control device.

The vehicle 1 illustrated in FIG. 1 comprises in particular a steering control device 10, the function of which is to act on the direction of the vehicle, and for example by maintaining the vehicle in a targeted trajectory during a turn at more or less speed, by a steering action on either of the wheel trains 2 of the vehicle 1.

The steering control device 10 comprises more particularly a control unit 12 which is configured to emit control commands 13 in the direction of control actuator(s) respectively associated with one of the wheels 2.

In the example illustrated in FIG. 1, the control actuators comprise more particularly first control actuators 3 associated with a steering system of a front wheel axle, second actuators 4 associated with a steering system of a rear wheel axle, the vehicle comprising a four-wheel steering system.

These control actuators also include third control actuators 6 associated with a decoupled braking system with each third control actuator 6 being associated with one of the wheels 2 of the vehicle in order to generate, in the event of a decoupled braking request, a specific yaw moment at each wheel, or at all or at least at each wheel set, either before or behind.

The vehicle also comprises at least one sensor 8, which may in particular take the form of a speed sensor arranged at one of the wheels. Other sensors 8 may be provided to account for the variation in dynamic parameters during the driving of the vehicle.

The steering control device 10 and in particular the control unit 12 will now be described in more detail.

In particular, the control unit 12 includes a calculation module 14 in which is implemented a model of lateral dynamic behavior of the chassis 16 which, as previously specified, expresses the physical quantities specific to the lateral dynamics of the chassis as a function of the specific drifts and removed from each set of wheels, a specific drift being associated with a set of wheels. The control unit 12 is an electronic controller such as computer or central processing unit (CPU) that includes at least one processor and memory. The control unit 12 is formed of one or more semiconductor chips that are mounted on a circuit board. The terms "control unit" and "electronic controller" as used herein refers to hardware that executes a software program, and does not include a human being. The control unit 12 can be one or more integrated circuits having firmware for causing the circuitry to steer the vehicle 1 as described herein. The calculation module 14 is part of the control unit 12 that includes a processor and memory having an algorithm for performing the lateral dynamic behavior model 16 as described herein.

The control unit 12 is configured to retrieve input parameters 18 intended to be loaded into the calculation module 14, as well as dynamic driving parameters 19, which form characteristic values of the driving of the vehicle. This control unit 12 is configured to operate the calculation module 14 by applying the lateral dynamic behavior model 16 of the chassis with these different parameters 18, 19, and to generate, as a function of the control instructions 13 in the direction of one and/or the other of the various control actuators 3, 4, 6.

The input parameters 18 include, in particular, at least one specific drift of a running gear of the vehicle, and more particularly both the specific drift $\delta s_1$ of the front wheel axle and the specific drift $\delta s_2$ of the rear-wheel axle. The parameters may further comprise the mass distribution $\alpha$, which may consist of a ratio of the mass of the front wheel axle to the mass of the vehicle and the distribution of inertia $\lambda$, for example in the form of a ratio of inertia, of the vehicle, as well as the mass M of the vehicle, the wheelbase 1 of the vehicle, and a reduction coefficient of direction $\eta$.

The mass M of the vehicle here considered as an input parameter 18 is the vacuum mass of the vehicle, which also makes it possible, in addition to having a fixed value implemented in the control unit, to ensure that the corrective action which will take place on either of the trains is not likely to block the wheels.

Each input parameter 18 is implemented in the calculation module with a value determined in particular during the design of the vehicle and/or during the development of the vehicle.

By way of non-limiting example, the specific drift $\delta s_1$ of the front wheel axle has a value of between 0.3 and 1 deg/(m/s2). The specific drift $\delta s_2$ of the rear wheel axle may have a value of between 0.1 and 0.6 deg/(m/s2).

The value of the specific drift $\delta s_2$ of the rear-wheel axle can be modified as a function of a speed V of the vehicle and of a desired type of behavior. To this end, the control unit may comprise a storage memory 20 in which is stored a table of values associating a speed, or a driving behavior, among which for example an economic duct or a sports line, at a value of the specific drift $\delta s_2$ of the rear-wheel axle. More particularly, if it is desired to have good lateral guiding performance at high speeds, and thus a more economical lateral dynamic behavior, and the most safe, it is suitable to provide for lowering the specific drift value of the rear-wheel axle.

The dynamic driving parameters 19 are recovered by the control unit 12 and can include, in particular, the speed of the vehicle, the steering angle of the front wheels and the steering angle of the rear wheels. The calculation module 14, via the lateral dynamic behavior model 16, is able to define whether an effective value of a dynamic driving parameter involves a variation in the calculated data and must generate a corrective action on the chassis via the control actuators.

The lateral dynamics behavior model 16 can be implemented both during a focusing process, the reference and actual values of the various parameters 18, 19 being inputted to the control unit 12 by an operator, in order to test the operation of the chassis when a given deviation between a reference datum calculated on the basis of the reference values and an actual datum calculated on the basis of the actual values is observed, only during a driving of the vehicle, in order to carry out corrective actions on the direction in real time.

In this latter case, the control device 10 is configured to communicate with a plurality of sensors, and for example the sensor 8 configured to determine the speed of the vehicle, whether it is both the longitudinal speed of the vehicle and its lateral speed.

These sensors 8 are configured to measure various dynamic parameters during the driving of the vehicle, and it should be noted that these sensors can be, without departing from the context of the invention, specifically dedicated to the operation of the steering control device or otherwise used for other functions implemented on the vehicle, as soon as the control unit of the control device according to the invention is able to recover these data on demand or continuously.

The control unit is configured to first compare a reference datum, calculated by applying the lateral dynamic behavior model 16 from values of the input parameters 18 and of reference values of the dynamic driving parameters 19, to an actual datum, calculated by applying the same model 16 from the values of the same input parameters 18 and of actual values of the dynamic driving parameters 19 measured in real time on the vehicle. The control unit is further configured to, in a second time, generate corrective action instructions in the event of a significant deviation between the reference datum and the actual datum.

Figure 2:
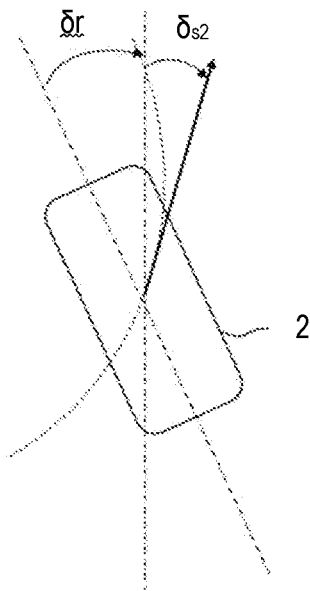
FIG. 2 is a schematic representation of a wheel of a vehicle being turned to illustrate the notion of specific drift of the train.

The lateral dynamic behavior model 16 will now be described in more detail, and the manner in which this model expresses the physical quantities specific to the lateral dynamics as a function of the specific drifts of the running gear as illustrated, by way of example for a rear wheel, in FIG. 2.

The lateral dynamic behavior model 16 is in particular written around a modal decomposition of the coupling and yaw-drift mode.

Each decomposition is associated with each actuator capable of generating a yaw moment, that is to say to each of the previously described control actuators and more particularly the steering angle actuator of the front wheels 3, the steering angle actuator of the rear wheels 4 and the decoupled braking actuator 6.

The first modal decomposition, relating to the first control actuators 3 associated with a steering system of a front wheel axle, is as follows:

$$\tau_\psi^2 s^2 Vm1 + 2\zeta_\psi \tau_\psi s Vm1 + Vm1 = G0\delta_f \quad (1)$$

The second modal decomposition, relating to the second actuators 4 associated with a steering system of a rear wheel axle, is as follows:

$$\tau_\psi^2 s^2 Vm2 + 2\zeta_\psi \tau_\psi s Vm2 + Vm2 = -G0\delta_r \quad (2)$$

The third modal decomposition, relating to the third control actuators 6 associated with a decoupled braking system, is as follows:

$$\tau_\psi^2 s^2 Vm3 + 2\zeta_\psi \tau_\psi s Vm3 + Vm3 = \left(\frac{\delta_{s1}}{LM\alpha} - \frac{\delta_{s2}}{LM(-1+\alpha)}\right) G0 M_{vdc} \quad (3)$$

For each of these modal compositions, a:

$\delta_f$: Steering Angle of the wheels of the front wheel running gear, in rad;
$\delta_r$: Steering Angle of the wheels of the rear wheel running gear, in rad;
$M_{vdc}$: Moment of yaw rotation of the braking system, in Nm;
L: Wheelbase, in m;
Vm=Vm1+Vm2+Vm3: Modal vector of the coupling mode and yaw/drift mode;
α: Distribution of mass, s.u;
G0: Yaw Gain, in dry 1;
$\delta s_1$: specific forward drift, in rad/(m/s2);
$\delta s_2$: Rear specific drift, in rad/(m/s2);
$\tau_\psi$: Constant time of the yaw/drift coupled mode, in a dry state;
$\zeta_\psi$: Damping the yaw/drift coupled mode, s.u.

With such a decomposition, the physical quantities that are the yaw rate, the lateral acceleration, and the drift angle can be expressed as a linear combination of the components of the modal vector.

The yaw rate is then expressed by:

$$vpsi = (1+\tau_2 s)Vm1 + (1+\tau_1 s)Vm2 + (1+s\tau_{vdc})Vm3 \quad (4)$$

Moreover, the drift at the center of gravity is expressed by:

$$\beta = \frac{(\alpha L - \delta_{s2} V^2)(1+s\tau_{\beta 1})Vm1}{V} + \frac{(\alpha L - \delta_{s1} V^2 - L)(1+s\tau_{\beta 2})Vm2}{V} \quad (5)$$

and the lateral acceleration is expressed by a linear combination of the two preceding variables $$lat_G = Vvspi + Vs\beta \quad (6)$$

All the parameters are here expressed as a function of the specific drifts. A time constant $\tau_\psi$, of the yaw/drift coupled mode is thus written:

$$\tau_\psi := \frac{1}{\sqrt{\frac{\lambda}{L}} \sqrt{\frac{1}{\delta_{s2}} - \frac{1}{\delta_{s1}}} \sqrt{1 + \frac{L}{(\delta_{s1} - \delta_{s2})V^2}}} \quad (7)$$

A reduced damping $\zeta_\psi$, of the coupled yaw/drift mode is thus written:

$$\zeta_\psi := \frac{1}{2} \frac{\frac{\alpha + \lambda(1-\alpha)}{\delta_{s1}} + \frac{\lambda\alpha + 1 - \alpha}{\delta_{s2}}}{\sqrt{\frac{L}{\delta_1 - \delta_2}} \sqrt{\frac{\lambda}{L}} \sqrt{\frac{1}{\delta_{s2}} - \frac{1}{\delta_{s2}}} \sqrt{1 + \frac{V^2(\delta_{s1} - \delta_{s2})}{L}}} \quad (8)$$

A yaw gain G0 thus written:

$$G0 := \frac{V}{L + (\delta_{s1} - \delta_{s2})V^2} \quad (9)$$

Furthermore, the corresponding transmission zeros have the following shapes, again expressed as a function of one and/or the other of the specific drifts ($\delta s_1$, $\delta s_2$). The yaw rate transmission zero relative to a steering control of the wheels of the rear-wheel axle is written:

$$\tau_1 = V\delta s_1 \quad (10)$$

The zero rate of yaw transmission with respect to a steering control of the wheels of the front wheel axle is written $$\tau_2 = V\delta s_2 \quad (11)$$

The zero angle of drift transmission with respect to a steering control of the wheels of the rear-wheel axle is written $$\tau_{\beta 1} = \frac{V\delta s_2 L\alpha}{(\alpha L - \delta s_2 V^2)\lambda} \quad (12)$$

The zero angle of drift transmission with respect to a steering control of the wheels of the front wheel axle is written $$\tau_{\beta 2} = \frac{(-1+\alpha)\delta s_{1ref} 2VL}{(\alpha L - \delta s_{1ref} V^2 - L)\lambda} \quad (13)$$

The yaw rate transmission zero relative to a yaw moment generated by the braking system is written $$\tau_{vdc} = \frac{V\delta s_2 \delta s_1}{(1-\alpha)\delta s_1 + \delta s_2 \alpha} \quad (14)$$

It is then possible to express the transfer functions usually used in the context of the automobile dynamics, namely the yaw rate, the lateral acceleration and the lateral forces, as a function of the specific drifts, thereby enabling the lateral transient dynamics of the vehicle to be quantified.

The lateral dynamic behavior model 16, implemented in the control unit 12, is in particular configured to express the yaw rate as a function of each of the modal compositions of the relationship between yaw and drift of the vehicle, and to now describe calculations considering more particularly this yaw rate and in particular the expression of the yaw rate transfer function.

The transfer function between the yaw rate of the front wheels can be read as follows:

$$\frac{(1+\tau_2 s)G0}{\tau_\psi^2 s^2 + 2\zeta_\psi \tau_\psi s + 1} \quad (15)$$

The transfer function between the yaw rate and the steering of the rear wheels can be read as follows:

$$-\frac{(1+\tau_1 s)G0}{\tau_\psi^2 s^2 + 2\zeta_\psi \tau_\psi s + 1} \quad (16)$$

The transfer function between the yaw rate and a yaw moment exerted by the braking system can be read as follows:

$$\frac{G0((-1+\alpha)\delta_{s1} - \delta_{s2}\alpha)(1+s\tau_{vdc})}{LM\alpha(\tau_\psi^2 s^2 + 2\zeta_\psi \tau_\psi s + 1)(-1+\alpha)} \quad (17)$$

The lateral dynamic behavior model 16 is thus configured to express a transfer function between the yaw rate and each of the systems associated with a control actuator, as a function of a static-dynamic gain defined as a function of the specific drifts of the front and rear wheel axles of the vehicle.

The calculation actions performed by the control unit 12 will now be described, and more particularly by the calculation module 14, considering the various expressions of the lateral dynamic behavior model as previously described.

As stated above, the calculation module 14 is configured to allow control of the behavior of the chassis by calculating a datum, and more particularly here a yaw moment of rotation, both for reference values and for actual values of different parameters used to calculate this datum, that these actual values are introduced by an operator or retrieved in real time when the vehicle is running by the control device.

The yaw moment of the vehicle is given by the product between the yaw inertia and the yaw acceleration, according to the following equation:

$$M_{yaw} = I_{zz} s^2 \psi \quad (18)$$

The calculation module 14 takes into account the lateral dynamic behavior model 16 and of the formulation of the transfer functions which have been mentioned previously to the equations (15), (16) and (17), and calculates a yaw moment on the basis of the specific drifts using the following equation:

$$M_{yaw} = \frac{I_{zz}(1+\tau_2 s)G0 \, \delta_f}{\tau_\psi^2 s^2 + 2\zeta_\psi \tau_\psi s + 1} - \frac{I_{zz}s(1+\tau_1 s)G0 \, \delta_r}{\tau_\psi^2 s^2 + 2\zeta_\psi \tau_\psi s + 1} + \frac{G0(-\delta_{s1} + \delta_{s1}\alpha - \delta_{s2}\alpha)(1+s\tau_{vdc})M_{vdc}}{(\tau_\psi^2 s^2 + 2\zeta_\psi^\tau \psi^{s+1})\alpha ML(-1+\alpha)} \quad (19)$$

At the same time, the calculation module 14 calculates a reference for this yaw moment, which is written in such a way:

$$M_{yaw} = I_{zz}s^2 \psi_{ref} \quad (20)$$

The reference yaw rate should only be a function of the steering wheel angle, that is to say that the steering of the front wheels, since it is assumed that it is given by a reference vehicle that has only two steered wheels, or in other words since the assumption that the reference yaw rate results in only the steering wheel angle applied by the driver.

The reference yaw rate can therefore be expressed as follows, taking into account only the transfer function evoked by equation (15):

$$s\psi_{ref} = \frac{G0_{ref}(1+\tau_{2ref}s)s\delta_f}{1+2\zeta_{\psi_{ref}}\tau_{\psi_{ref}}s + s^2 \tau_{\psi_{ref}}^2} \quad (21)$$

The reference yaw moment is therefore expressed as follows, as a function of the two preceding equations:

$$M_{yaw} = I_{zz}s \frac{G0_{ref}(1+\tau_{2ref}s)s}{1+2\zeta_{\psi_{ref}}\tau_{\psi_{ref}}s + s^2 + \tau_{\psi_{ref}}^2} \delta_f \quad (22)$$

Figure 3:
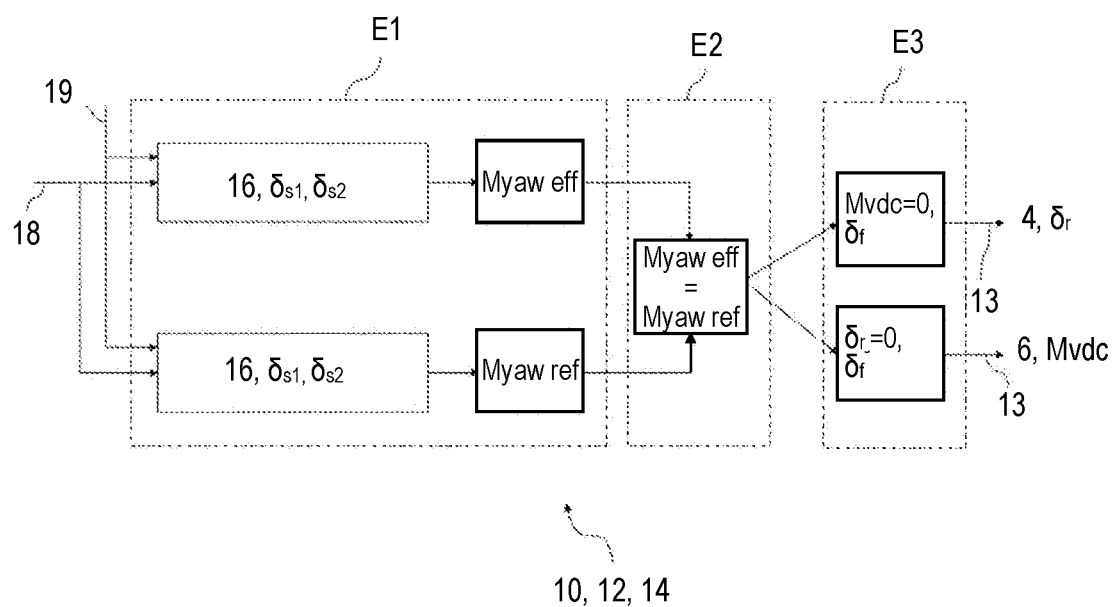
FIG. 3 is a log representing an operating mode of the control unit illustrated schematically in FIG. 1.

The calculation module 14, via the lateral dynamic behavior model 16, is configured so as to achieve, in a first time, a calculation step E1, as visible in FIG. 3.

In the calculation step E1, the module calculates on the one hand the effective yaw moment Myaw eff, that is to say the calculation of the yaw moment expressed in equation (19) with the values of the input parameters 18 and the actual values of the dynamic driving parameters 19, and on the other hand the calculation of the reference yaw moment Myaw ref, that is to say the calculation of the yaw moment expressed in equation (22) with the values of the input parameters 18 and the reference values of the dynamic driving parameters 19.

The control unit 12 is set so that the calculation module can realize the simultaneous calculation of the reference yaw moment and the effective yaw moment. In a second time, and as illustrated in FIG. 3 during a comparison step E2, the module of calculation equalizes the effective yaw moment and the reference yaw moment, according to the following equation:

$$\frac{G0_{ref}(1+\tau_{2ref}s)\delta_f}{1+2\zeta_{\psi_{ref}}\tau_{\psi_{ref}}s + s^2 + \tau_{\psi_{ref}}^2} = \frac{(1+\tau_2 s)G0 \, \delta_f}{\tau_\psi^2 s^2 + 2\zeta_\psi \tau_\psi s + 1} - \frac{(1+\tau_1 s)G0 \, \delta_r}{\tau_\psi^2 s^2 + 2\zeta_\psi \tau_\psi s + 1} + \frac{G0(-\delta_{s1} + \delta_{s1}\alpha - \delta_{s2}\alpha)(1+s\tau_{vdc})M_{vdc}}{(\tau_\psi^2 s^2 + 2\zeta_\psi \tau_\psi s + 1)\alpha ML(-1+\alpha)} \quad (23)$$

Then in a third time, and as illustrated in FIG. 3 during a deduction step E3, the calculation module derives from the equality relationship (23) the values that are to comply with the rear angle and the braking yaw moment as a function of the steering angle of the front wheel set.

In the case where the vehicle has a four steered wheel system, without a decoupled braking system, the calculation module imposes in the equation (23) a yaw moment of the braking system equal to zero (Mvdc=o) and thus a direct relationship giving the steering angle of the rear wheel set is obtained as a function of the steering angle of the front wheel set which is written in such a way:

$$\delta_r = \frac{G0 G0_{ref}(1+\tau_{zref}s)\delta_f(\tau_\psi^2 s^2 + 2\zeta_\psi \tau_\psi s + 1)}{\left(1 + 2\zeta_{\psi_{ref}}\tau_{\psi_{ref}}s + s^2\tau_{\psi_{ref}}^2\right)(1+\tau_1 s)G0} + \frac{(1+\tau_2 s)\delta_f}{1+\tau_1 s} \quad (24)$$

In this context, the steering angle of the rear wheel set is controlled in a unique manner depending on the steering angle of the front wheel set. In other words, the steering angle of a rear wheel, or the rear wheel set, is determined for a determined steering angle of the front wheel set and for equality of the calculated reference yaw moment with the calculated effective yaw moment.

In a complementary manner, and in particular as a function of analysis performed by the inventors based on the lateral dynamic behavior model of the chassis, and described below, the control unit is configured to issue a priority control command directed to the one or more control actuators associated with the steering system of the rear-wheel axle, before transmitting if necessary a control command directed to the one or more control actuators associated with the steering system of the front wheel axle.

In the case where the vehicle has a decoupled braking system, without four steered wheels, it is chosen to control the yaw moment generated by the braking system as a function of the steering angle of the front wheel set and the equation (23) is written in such way:

$$M_{vdc} = -\frac{(1-\alpha)LM\alpha\delta_f\left(-\frac{c0_{ref}}{G0}+1\right)}{(1-\alpha)-\delta_{s1}+\delta_{s2}} \left(-\frac{(1+\tau_{2ref}s)\cdot(\tau_\psi^2 s^2 + 2\zeta_\Psi\tau_\psi s + 1)}{\left(1+2\zeta_{\psi_{ref}}\tau_{\psi_{ref}}s + s^2\tau_{\psi_{ref}}^2\right)\cdot(1+s\ \tau_{vdc})} + \frac{(1+\tau_2 s)}{(1+s\ \tau_{vdc})}\right) \quad (25)$$

In other words, a yaw moment generated by the braking of a wheel is determined for a determined steering angle of the front wheel set of the chassis and for equality of the calculated reference yaw moment with the calculated effective yaw moment.

In the case where the vehicle has a decoupled braking system and a four-wheel steering system, the calculation module can determine, according to the steering angle of the front wheel set, a pair of values for a steering angle of the rear wheel set and for a yaw moment generated by the control actuators associated with the corresponding wheel train. Alternatively, and in particular as a function of analysis performed by the inventors based on the lateral dynamic behavior model of the chassis, and described below, the control unit is configured to issue a priority control command directed to the one or more control actuators associated with the steering system of the wheels, and in particular of the rear wheel set, before transmitting, if appropriate, a control command directed to the control actuator(s) associated with the decoupled braking system.

The use of the lateral dynamic behavior model of the chassis will now be described and the qualitative analysis thereof makes it possible, for example, to define, as just described, which control actuator should be prioritized.

As described above, the course of the transfer functions is identical for the three inputs that are the steering of the front wheel set, the steering of the rear wheel set and the moment of yaw rotation generated by the decoupled braking system, each being a function of a star-dynamic gain G0.

By way of example, the study of the static gain in yaw rate as A function of the steering input of the running gear, that is to say, by studying the previously mentioned equations (15) and (16), makes it possible to determine that, for A steering input, that the undercarriage is the front or rear wheel axle, the gain is then given by:

$$G0 := \frac{V}{L + (\delta_{s1} - \delta_{s2})V^2} \quad (26)$$

This gain causes two fundamental quantities to appear explicitly. A first fundamental quantity 1 characterizes the wheelbase of the vehicle, and a second fundamental quantity $(\delta_{s1}-\delta_{s2})$ characterizes the deviation between the front and rear specific drifts, also referred to as an understeer gradient.

The gain is maximum at the characteristic speed given by:

$$V_{ch} = \sqrt{\frac{L}{\delta_{s1} - \delta_{s2}}} \quad (27)$$

The calculation module considers this relationship to determine the specific drift of the rear-wheel axle to be applied as a function of the specific drift of the front wheel axle.

The study of the dynamic behavior of the transfer functions and, in particular, the zeros of these different transfer functions also allows qualitative analysis to be noted.

With regard to the steering of the wheels of the front wheel set, the time constant of the zero is proportional to the specific rear specific drift at a given speed, with:

$$\tau_2 := V\delta_{s2} \quad (28)$$

If the steering is carried out by the rear wheel set, the time constant of the zero is proportional to the specific forward drift, at a given speed, with:

$$\tau_1 := V\delta_{s1} \quad (29)$$

Finally, if a yaw moment is generated by the decoupled braking system, the time constant of the zero is expressed as a function of the specific drifts of the two running gear, with:

$$\tau_{vdc} = \frac{V\delta_{s2}\delta_{s1}}{(1-\alpha)\delta_{s1} + \delta_{s2}\alpha} \quad (30)$$

The inventors have been able to determine, for an understeer gradient equal to 0.3°/(m/s2), that, of a dynamic view bridge, the speed of the response is incongruently to the advantage of a steering input of the wheels of the rear wheel set, then a steering input of the wheels of the front wheel set, then a moment of yaw rotation generated by the decoupled braking system.

As a result of the detailed description which has just been given to the aim of being attached, namely, to propose a modification of the existing control devices which makes it possible to reliably and quickly give the vehicle several configurations according to the target of a reference model. This is achieved in particular by implementing in a control unit a chassis lateral dynamic behavior model that is only expressed as a function of the system characteristics of the chassis among which the specific drifts of the front and rear wheel axles. The choice of specific drifts can thus allow the desired understeer gradient and the guidance performance of the rear-wheel axle to be modified in particular. Another interest of this model is to differentiate the evolution of the yaw gain depending on whether it is carried out by a variation in wheelbase or a variation in the understeer gradient (deviation between the specific drifts).

What is claimed is:

1. A steering control device for controlling at least one control actuator associated with one of a steering system of a vehicle and of a decoupled braking system at a wheel of the vehicle, the control device comprising:
at least one control unit having a processor configured to retrieve at least one characteristic value of driving of the vehicle and to transmit a control command as a function of the least one characteristic value to the at least one control actuator, and
the control unit being configured to implement a lateral dynamic behavior model of a chassis of the vehicle in which at least one specific physical quantity of a lateral dynamic behavior of the vehicle is expressed as a function of specific drifts of each of the front and rear wheel axles of the vehicle.

2. The steering control device according to claim 1, wherein
the lateral dynamic behavior model implemented by the control unit is configured such that at least a yaw rate is expressed as a function of the specific drifts of each of the front and rear wheel axles of the vehicle.

3. The steering control device according to claim 2, wherein
the lateral dynamic behavior model implemented by the control unit is configured to express a transfer function between the yaw rate and the steering system of at least one of the front wheel axle and the rear wheel axle, as well as a transfer function between a yaw moment exerted by the at least one actuator associated with the decoupled braking system as a function of a static-dynamic gain defined as the function of the specific drifts of the front and rear wheel axles of the vehicle.

4. The steering control device according to claim 3, wherein
the control unit is configured to output a priority control command directed to the at least one control actuator associated with the steering system, before transmitting a control command directed to the at least one control actuator associated with the steering system.

5. The steering control device according to claim 3, wherein
the static-dynamic gain relating to each of the steering systems of the front and rear wheel axles is a function of an understeer gradient, that is a difference between the specific drift of the front wheel axle and the specific drift of the rear wheel axle.

6. The steering control device according to claim 5, wherein
the control unit is configured to output a priority control command directed to the at least one control actuator associated with the steering system of the rear wheel set before transmitting a control command directed to the at least one control actuator associated with the steering system of the wheel axle.

7. The steering control device according to claim 1, wherein
the control unit is configured to receive input parameters and dynamic driving parameters, and the control unit is further configured to first compare a reference datum calculated by applying the lateral dynamic behavior model from values of the input parameters and reference values of the dynamic driving parameters, to an actual datum calculated by applying the lateral dynamic behavior model from values of the same input parameters and actual values of the dynamic driving parameters, and subsequently in a second time generating corrective action instructions in an event of a significant deviation between the reference datum and the actual datum.

8. The steering control device according to claim 7, wherein
the reference datum is a reference yaw moment and the actual datum is an effective yaw moment, the control unit is configured to calculate the reference yaw moment using the lateral dynamic behavior model with the reference values and to calculate the yaw moment effective (using the lateral dynamic behavior model with the actual values.

9. The steering control device according to claim 8, wherein
the control unit is configured to calculate simultaneously the reference yaw moment and the effective yaw moment.

10. The steering control device according to claim 8, wherein
the at least one control actuator is an actuator of the steering angle of a rear wheel of the vehicle, the steering angle of the rear wheel being determined for a front wheel set angle of the determined chassis and for equality of the calculated reference yaw moment with the calculated effective yaw moment.

11. The steering control device according to claim 8, wherein
the at least one control actuator is a braking actuator decoupled from a wheel of the vehicle, wherein a yaw moment generated by the braking of the wheel is determined for a front axle angle of the chassis and for equality of the reference yaw moment that was calculated with the effective yaw moment that was calculated.

12. The steering control device according claim 7, wherein
the input parameters include at least the specific drift of the front wheel axle and the specific drift of the rear wheel axle.

13. The steering control device according to claim 12, wherein
the specific drift of the rear wheel axle is set and determined according to a driving type identified by the control unit.

14. The steering control device according to claim 8, wherein
the input parameters comprise at least a mass distribution and an inertia distribution of the vehicle.

15. The steering control device according to claim 1, wherein the lateral dynamic behavior model is written around a modal decomposition of a relationship between yaw and drift of the vehicle, at least one decomposition being associated with a steering angle actuator of the front wheel axle and at least one other decomposition being associated with a steering angle actuator of the rear wheel axle or to a control actuator of a decoupled braking system.

16. The steering control device according to claim 15, wherein the lateral dynamic behavior model is configured to express the yaw rate as a function of each of the decompositions.

17. The steering control device according to claim 16, wherein the control unit is configured to communicate with a plurality of sensors capable of measuring values retrieved subsequently by the control unit when driving the vehicle.

18. A steering control method for controlling a direction of the vehicle equipped with the steering control device according to claim 1, the steering control method comprising:

first calculating an effective yaw moment and a reference yaw moment;

equalizing the effective yaw moment and the reference yaw moment that were calculated; and deducing at least one value that is to comply with at least one of a rear angle and a braking yaw moment as a function of a steering angle of the front wheels.

* * * * *